United States Patent [19]

Giesen et al.

[11] Patent Number: 5,258,142
[45] Date of Patent: Nov. 2, 1993

[54] LIQUID, FREE-FLOWING AND PUMPABLE SURFACTANT CONCENTRATE CONTAINING MIXED ANIONIC SURFACTANT AND ALKYL POLYGLYCOSIDE SURFACTANT

[75] Inventors: Brigitte Giesen; Andreas Syldath, both of Duesseldorf, Fed. Rep. of Germany

[73] Assignee: Henkel Kommanditgesellschaft auf Aktien, Duesseldorf-Holthausen, Fed. Rep. of Germany

[21] Appl. No.: 952,507

[22] PCT Filed: May 27, 1991

[86] PCT No.: PCT/EP91/00973

§ 371 Date: Oct. 7, 1992

§ 102(e) Date: Dec. 7, 1992

[87] PCT Pub. No.: WO91/18963

PCT Pub. Date: Dec. 12, 1991

[30] Foreign Application Priority Data

Jun. 5, 1990 [DE] Fed. Rep. of Germany ....... 4017922

[51] Int. Cl.$^5$ .................... C11D 1/14; C11D 1/83
[52] U.S. Cl. .................... 252/552; 252/550; 252/554; 252/173; 252/174.17; 252/DIG. 14
[58] Field of Search ............... 252/550, 552, 554, 173, 252/174.17, DIG. 14

[56] References Cited

U.S. PATENT DOCUMENTS

| | | | |
|---|---|---|---|
| 3,547,828 | 12/1970 | Mansfield et al. | 252/351 |
| 4,017,409 | 4/1977 | Demessemaekers et al. | 252/552 |
| 4,235,752 | 11/1980 | Rossall et al. | 252/552 |
| 4,396,520 | 8/1983 | Payne et al. | 252/89.1 |
| 4,663,069 | 5/1987 | Llenado | 252/174.17 |
| 4,671,895 | 6/1987 | Erilli et al. | 252/552 |
| 4,732,704 | 3/1988 | Biermann et al. | 252/174.17 |
| 4,820,448 | 4/1989 | Wegener et al. | 252/174.21 |
| 5,025,069 | 6/1991 | Deguchi et al. | 252/552 |
| 5,035,814 | 7/1991 | Maaser | 252/174.17 |
| 5,138,046 | 8/1992 | Wuest et al. | 536/120 |

FOREIGN PATENT DOCUMENTS

| | | |
|---|---|---|
| 070074 | 1/1983 | European Pat. Off. |
| 0092355 | 10/1983 | European Pat. Off. |
| 0092877 | 11/1983 | European Pat. Off. |
| 105556 | 4/1984 | European Pat. Off. |
| 136844 | 4/1985 | European Pat. Off. |
| 216301 | 4/1987 | European Pat. Off. |
| 259741 | 3/1988 | European Pat. Off. |
| 0301298 | 2/1989 | European Pat. Off. |
| 0357969 | 3/1990 | European Pat. Off. |
| 0362671 | 4/1990 | European Pat. Off. |
| 0370312 | 5/1990 | European Pat. Off. |
| 8602943 | 5/1986 | World Int. Prop. O. |

OTHER PUBLICATIONS

Schwartz/Perry, Surface Active Agents, vol. 1, Interscience Publishers, 1949, p. 372.

*Primary Examiner*—Paul Lieberman
*Assistant Examiner*—Bradley A. Swope
*Attorney, Agent, or Firm*—Ernest G. Szoke; Wayne C. Jaeschke; John E. Drach

[57] ABSTRACT

The concentrates consist essentially of 35 to 55% by weight water, 10 to 30% by weight of an alkyl glycoside corresponding to the formula $R^1-O(G)_n$, in which $R^1$ is a $C_{8-22}$ alkyl radical, G is a glycose unit and n is a number of 1 to 10, 10 to 30% by weight of an alkyl sulfate corresponding to the formula $R^2-O-SO_3X$, in which $R^2$ is a $C_{8-22}$ alkyl radical and X is an alkali or ammonium ion, and 1 to 15% by weight of an alkane sulfonate corresponding to the formula $$R^3-CH-SO_3Y \qquad (III)$$
$$\underset{R^4}{|}$$

in which $R^3$ and $R^4$ independently of one another represent $C_{1-18}$ alkyl radicals, with the proviso that the total number of carbon atoms in the alkane sulfonate is between 10 and 20, and Y is an alkali or ammonium ion. They are used as storable, free-flowing and pumpable compounds, preferably for the production of detergents.

7 Claims, No Drawings

LIQUID, FREE-FLOWING AND PUMPABLE SURFACTANT CONCENTRATE CONTAINING MIXED ANIONIC SURFACTANT AND ALKYL POLYGLYCOSIDE SURFACTANT

BACKGROUND OF THE INVENTION

1. Field of the Invention

This invention relates to concentrated surfactant mixtures of alkyl glycosides, alkyl sulfates and alkane sulfonates in the form of stable, free-flowing and pumpable liquids and to their use as compounds for the production of liquid detergents.

2. Statement of Related Art

It has long been known that alkyl glycosides containing long-chain alkyl groups are nonionic surfactants. The expert also knows (as described, for example, in A. M. Schwartz, J. W. Perry, Surface Active Agents, Vol. 1, Interscience Publishers, 1949, page 372) that surfactant mixtures generally show synergistic effects and often have detergent properties better than the sum total of the values of the individual components.

Detergents containing alkyl glycosides in combination with at least one typical anionic surfactant are described in European patent application EP 070 074. Detergents containing alkyl glycosides and anionic surfactants are known from European patent application EP 092 877. In addition, liquid detergents containing alkyl glycosides, certain other nonionic surfactants and anionic surfactants are known from European patent application EP 105 556. Liquid detergents containing alkyl glycosides and typical anionic surfactants are known from International patent application WO 86/02943.

In the production of liquid detergents, the individual components are generally used in the form of free-flowing solutions which each contain one substance or which, as so-called compounds, consist of several substances typically encountered in detergents. The components intended for mixing to the final detergent should have as high an active substance content as possible and, at the same time, should be easy to handle, i.e. they should be free-flowing and readily pumpable and should have high stability in storage. Alkyl glycosides are normally obtained in the form of highly viscous pastes.

The problem addressed by the present invention was to develop a storable liquid surfactant mixture from an alkyl glycoside paste.

This problem has been solved by an aqueous mixture of certain quantities of alkyl glycoside, alkyl sulfate and secondary alkane sulfonate.

DESCRIPTION OF THE INVENTION

The compounds according to the invention are aqueous mixtures consisting essentially of an alkyl glycoside and two different synthetic anionic surfactants, an alkyl sulfate and an alkane sulfonate, the alkyl glycoside corresponding to formula I $$R^1-O(G)_n \qquad (I)$$

in which $R^1$ is a $C_{8-22}$ alkyl radical, G is a glycose unit and n is a number of 1 to 10, the alkyl sulfate corresponding to formula II $$R^2-O-SO_3X \qquad (II)$$

in which $R^2$ is a $C_{8-22}$ alkyl radical and X is a cation selected from the group comprising hydrogen, alkali and ammonium ions, and the alkane sulfonate corresponding to formula III

in which $R^3$ and $R^4$ independently of one another represent $C_{1-18}$ alkyl radicals, with the proviso that the total number of carbon atoms in the alkane sulfonate is between 10 and 20, and Y is a cation selected from the group consisting of hydrogen, alkali and ammonium ions, the compounds containing 35 to 55% by weight water, 10 to 30% by weight and preferably 17 to 25% by weight alkyl glycoside, 10 to 20% by weight and preferably 12 to 18% by weight alkyl sulfate and 1 to 15% by weight and preferably 3 to 10% by weight alkane sulfonate.

The alkyl glycosides suitable for the surfactant mixtures according to the invention and their production are described, for example, in European patent applications EP 92 355, EP 301 298, EP 357 969 and EP 362 671 or in U.S. Pat. No. 3,547,828. The glycoside components ($(G)_n$ in formula I) of these alkyl glycosides are oligomers or polymers of naturally occurring aldose or ketose monomers, including in particular glucose, mannose, fructose, galactose, talose, gulose, altrose, allose, idose, ribose, arabinose, xylose and lyxose and mixtures thereof. The oligomers consisting of these glycoside-bonded monomers are characterized not only by the type of sugar present therein, but also by their number, the so-called degree of oligomerization. As an analytically determined quantity, the degree of oligomerization (n in formula I) is generally a broken number and is in the range from 1 to 10 and, in the case of the alkyl glycosides preferably used, below 1.5 and, more particularly, in the range from 1 2 to 1.4. By virtue of its ready availability, glucose is the preferred monomer unit.

The alkyl moiety ($R^1$ in formula I) of the alkyl glycosides present in the surfactant mixtures according to the invention also emanates preferably from readily available derivatives of renewable raw materials, more particularly from fatty alcohols, although branched-chain isomers thereof, particularly so-called oxo alcohols, may also be used for the production of suitable alkyl glycosides. Accordingly, primary alcohols containing linear octyl, decyl, dodecyl, tetradecyl, hexadecyl or octadecyl groups and mixtures thereof are particularly useful. Particularly suitable alkyl glycosides contain a coconut oil fatty alkyl radical, i.e. mixtures in which essentially $R^1$=dodecyl and $R^1$=tetradecyl.

From their production, the alkyl glycosides may contain small quantities, for example 1 to 2%, of unreacted long-chain alcohol which does not adversely affect the properties of the surfactant mixtures produced with them.

Alkyl sulfates suitable for use in the surfactant mixtures according to the invention are the neutralized sulfation products of the above-mentioned alcohols. The derivatives of $C_{8-22}$ fatty alcohols and, more particularly, $C_{12-18}$ fatty alcohols are also particularly suitable in this case. The alkyl sulfates may be prepared in known manner by reaction of the corresponding alcohol component with a typical sulfating agent, more particularly sulfur trioxide or chlorosulfonic acid, and subsequent neutralization, preferably with alkali bases, ammonium bases or alkyl- or hydroxyalkyl-substituted ammonium bases.

The secondary alkane sulfonates used in accordance with the invention are neutralized substances obtained by sulfoxidation of hydrocarbons preferably containing 10 to 20 carbon atoms. Products in which the sulfonic acid substituents are statistically distributed are generally formed and can be separated in known manner. $C_{12-17}$ alkane sulfonates have proved to be particularly suitable for the mixture according to the invention. Particularly suitable cations are those from the group consisting of alkali ions, ammonium ions or alkyl- or hydroxyalkyl-substituted ammonium ions.

The production of the surfactant mixtures according to the invention does not present any difficulties. It may readily be carried out simply by mixing the three individual components which may be present as such or preferably in aqueous solution.

The mixtures according to the invention are distinguished by their low viscosities, their free flow and pumpability and their high stability in storage. The viscosity of the compounds is generally in the range from 20,000 mPa.s to 50,000 mPa.s. The compounds according to the invention are stable in storage for prolonged periods of at least 30 days at temperatures of from about 1° C. to about 45° C.

The compounds according to the invention may be used for industrial applications, for example as flotation aids or drilling fluids, either directly or after dilution with water. However, they are preferably used as compounds for the production of liquid detergents, including in particular light-duty detergents, wool detergents and dishwashing detergents and also shampoos. The detergents in question may readily be produced by dilution of the compounds with water to the desired active substance concentration. Other constituents of the type typically encountered in detergents of the type in question may be added and include, in particular, builders, such as zeolites and layer silicates, corrosion inhibitors, bleaches, bleach activators, optical brighteners, enzymes, redeposition inhibitors, antimicrobial agents, water-miscible solvents, abrasives, foam stabilizers, preservatives, pH regulators, dyes and fragrances and additional surfactants.

EXAMPLES

Example 1

Surfactant mixtures M1 to M3 according to the invention characterized by their composition in Table 1 below and comparison surfactant mixtures C1 to C5 were prepared simply by mixing the components which were present in the form of aqueous solutions.

TABLE 1

| Compositions of the surfactant mixtures [% by weight] | | | | | | | | |
|---|---|---|---|---|---|---|---|---|
| | M1 | M2 | M3 | C1 | C2 | C3 | C4 | C5 |
| A | 21.8 | 24.0 | 23.0 | 50.0 | 24.0 | 21.8 | 16.3 | 30.5 |
| B | 14.5 | 16.1 | 15.4 | — | 16.1 | 14.5 | 10.8 | — |
| C | 9.0 | 3.6 | 6.0 | — | — | — | — | 19.8 |
| Ether sulfate[a] | — | — | — | — | — | 9.1 | — | — |
| Aryl sulfonate[b] | — | — | — | — | — | — | 18.0 | — |
| Water | ad 100 | | | | | | | |

[a] Texapon ® N 70 (a product of Henkel KGaA);
[b] Na alkyl benzenesulfonate (Maranil ® A 55, a product of Henkel KGaA)
A: $C_{12/14}$ alkyl glucoside, degree of oligomerization 1.4
B: Na coconut oil fatty alcohol sulfate (Texapon ® LS 35, a product of Henkel KGaA)
C: $Na_{14/16}$ alkane sulfonate (Hostapur ® SAS 60 S, a product of Hoechst AG)

Surfactant mixtures M1 to M3 according to the invention had pH values (in the form of 10% by weight aqueous solutions) of 9.6.

TABLE 2

| Viscosities (20° C., Höppler falling ball viscosimeter) | | | | | |
|---|---|---|---|---|---|
| | M1 | M2 | M3 | C1 | C2 |
| Viscosity (20° C.) [mPa · s] | 25,000 | 40,000 | 25,000 | 28,850 | 55,540 |
| Optical appearance (room temperature) | Clear liquid | Clear liquid | Clear liquid | Clear liquid | Cloudy liquid |
| Optical appearance (+4° C.) | Clear liquid | Clear liquid | Clear liquid | Solid mass | Solid mass |

Mixture C3 was a gel which was solid and viscous both at room temperature and at 4° C. and of which the viscosity could not be determined. Mixtures C4 and C5 were inhomogeneous pastes which could still just flow at the temperatures indicated.

Samples of mixtures M1, M2 and M3 according to the invention were stored for 60 days at 4° C., 10° C. or 40° C. without any discernible change in viscosity. The compounds could be cooled to temperatures of 1° C. for 30 days without any discernible changes in viscosity in relation to the freshly prepared mixtures after heating to room temperature.

Example 2

Detergent Performance

Solutions containing 0.15 g active substance per liter solution were prepared from mixtures M1 to M3 and C1 to C5 by dilution with water. Detergent performance was demonstrated by the saucer test described by H. -J. Lehmann in "Fette, Seifen, Anstrichmittel", 74 (1972), 163. Saucers were soiled with beef tallow (2 g/saucer). The water used had a hardness of 3° Gh (30 mg CaO/liter) and 16° Gh (160 mg CaO/liter) and a temperature of 50° C. After storage for 24 hours at room temperature, the soiled saucers were rinsed with a rotating dishwashing brush. In every case, the detergent performance of the compounds according to the invention was at least equal to that of the comparison mixtures.

What is claimed is:

1. An aqueous, free-flowing and pumpable surfactant mixture consisting essentially of from about 35% to about 55% by weight of water; from about 10% to about 30% by weight of an alkyl polyglycoside of the formula I $$R^1-O(G)_n \qquad (I)$$

wherein $R^1$ is a $C_{8-22}$ alkyl radical, G is a glycose unit and n is a number from 1 to 10; from about 10% to about 20% by weight of an alkyl sulfate of the formula II $$R^2-O-SO_3X \qquad (II)$$

wherein $R^2$ is a $C_{8-22}$ alkyl radical and X is an alkali metal or ammonium ion; and from about 1% to about 15% by weight of an alkane sulfonate of the formula III

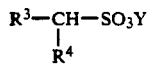

wherein each of $R^3$ and $R^4$ is independently a $C_{1-18}$ alkyl radical, Y is an alkali metal or ammonium ion, with the proviso that the total number of carbon atoms in said alkane sulfonate is from about 10 to about 20.

2. The surfactant mixture of claim 1 wherein the amount of said alkyl glycoside is from about 17% to about 25% by weight; the amount of said alkyl sulfate is from about 12% to about 18% by weight; and the amount of said alkane sulfonate is from about 3% to about 10% by weight.

3. The surfactant mixture of claim 1 wherein in said alkyl glycoside of formula I n is less than 1.5.

4. The surfactant mixture of claim 3 wherein in said alkyl glycoside of formula I n from about 1.2 to about 1.4.

5. The surfactant mixture of claim 1 wherein in said alkyl glycoside is an alkyl glucoside.

6. The surfactant mixture of claim 1 wherein $R^2$ is said alkyl sulfate of formula II is an alkyl radical having from about 12 to about 16 carbon atoms.

7. The surfactant mixture of claim 1 wherein said alkane sulfonate of formula III contains a total of from about 12 to 17 carbon atoms.

* * * * *